3,012,071
PREPARATION OF DIHYDRORESORCYLPROPIONIC ACID AND DELTA-KETOAZELAIC ACID

Ralph F. Gilby, Jr., Charleston, W. Va., assignor to E. I. du Pont de Nemours and Company, Wilmington, Del., a corporation of Delaware
No Drawing. Filed Apr. 22, 1960, Ser. No. 23,883
4 Claims. (Cl. 260—514)

This invention relates to the preparation of dihydroresorcylpropionic acid (also identified as 3-(2,6-dioxocyclohexyl)propanoic acid) and delta-ketoazelaic acid (also identified as 5-oxononandioic acid), and their respective lactones, directly from glutaric anhydride.

The dihydroresorcylpropionic acid can exist as the free acid, or, by splitting off one molecule of water, as the cyclic lactone 5-keto-3,4,5,6,7,8-hexahydrocoumarin. The delta-ketoazelaic acid can similarly exist in open chain form or in lactone form. Use of the acid expressions herein is intended to embrace both forms.

The process of the present invention comprises heating glutaric anhydride at an elevated temperature within the range from 150° to 300° C., and preferably between 200° and 250° C. Product yields are higher within the preferred temperature range.

The glutaric anhydride can be heated either alone or with small quantities of an alkali metal glutarate or an alkaline earth glutarate. An alkali metal hydroxide or an alkaline earth hydroxide which becomes a glutarate in the system can also be used. These compounds, including sodium glutarate, potassium glutarate, lithium glutarate, sodium hydroxide, potassium hydroxide, lithium hydroxide, calcium glutarate, barium glutarate, calcium hydroxide and barium hydroxide, increase the efficiency of the reaction, as well as the rate of reaction and product yield.

The reaction can be carried out satisfactorily at atmospheric pressure. Use of reduced pressures, such as between atmospheric pressure and about 10 millimeters of mercury, is advantageous in facilitating the conversion of the glutaric anhydride to dihydroresorcylpropionic acid. Pressures up to about 10 atmospheres can be used satisfactorily.

The basic catalyst compound will ordinarily be used in an amount of up to 5 or even 10% by weight, based on the weight of the glutaric anhydride. The upper limit will generally be one of economics, as will be readily understood. From 0.1% to 1.0% by weight of catalyst is preferred.

Carrying out the process of this invention as described above produces a mixture of dihydroresorcylpropionic acid and delta-ketoazelaic acid. The reaction first favors the production of the latter but continued heating increases the formation of the former at the expense of the latter. For example, it has been found (see below) that about 30 minutes of heating as described above converts about 25% of the glutaric anhydride to product components, with about three times more delta-ketoazelaic acid being formed than dihydroresorcylpropionic acid. However, after continued heating for about one hour, with almost half of the glutaric anhydride converted to products, the concentration of dihydroresorcylpropionic acid was from two to three times that of the delta-ketoazelaic acid. Further heating continues to favor the formation of the dihydroresorcylpropionic acid at the expense of the delta-ketoazelaic acid.

Thus, it can be seen that carrying out the process of this invention over a period of about one-half to about five hours results in high yields of dihydroresorcylpropionic acid. This acid can be separated from any unreacted glutaric anhydride by any convenient means, such as distillation; esterification followed by distillation; or recrystallization.

The dihydroresorcylpropionic acid product can be hydrolyzed to form the delta-ketoazelaic acid. For example, five grams of dihydroresorcylpropionic acid is dissolved in 50 milliliters of 12 N hydrochloric acid and refluxed for three hours. At the end of the reaction period, about 75% of the solution is boiled off. The delta-ketoazelaic acid is then readily crystallized from the remaining liquid.

Dihydroresorcylpropionic acid is useful for conversion to delta-ketoazelaic acid as just described. Delta-ketoazelaic acid can be reduced, such as with zinc amalgam in hydrochloric acid, hydrogen on platinum, hydrogen on copper chromite, or other well known procedures, to azelaic acid, a useful compound in commercial demand. The products of this invention are useful, particularly in the drug industry, as valuable chemical intermediates.

Dihydroresorcylpropionic acid and delta-ketoazelaic acid can be oxidized with nitric acid or chromic acid to form succinic acid and glutaric acid. Thus, succinic acid can be produced in good yields starting with glutaric anhydride, with the glutaric acid obtained being recycled.

This invention is highly advantageous in that it avoids the use of sodium metal, expensive reactants and difficult reaction conditions of prior art processes. Furthermore, excellent yields are obtained by the process of the present invention.

This invention will be further explained but is not intended to be limited by the following examples:

Example 1

Glutaric anhydride in an amount of 250 grams and 1.25 grams of sodium glutarate are placed in a 500 milliliters round bottom flask. The flask and contents are heated rapidly to about 250° C. at atmospheric pressure. An analysis of the contents of the flask after 30 minutes indicates 5.7% dihydroresorcylpropionic acid and 17.5% delta-ketoazelaic acid, with the remaining material being unreacted glutaric anhydride and catalyst. After an additional 30 minutes heating at the same temperature, the dihydroresorcylpropionic acid concentration has increased to 33.3% and the delta-ketoazelaic concentration has decreased to 14.1%, with the remaining material still glutaric anhydride and catalyst.

After four hours at the reaction temperature, the reaction pot is connected to a spinning band column (½" x 4') and the reaction mixture distilled under reduced pressure. The unreacted glutaric anhydride is recovered first, followed by the lactone of the dihydroresorcylpropionic acid (B.P. 188° C./20 mm.). The lactone is hydrolyzed in hot water and the acid recovered by crystallization.

Example 2

Example 1 is repeated except that 1.5 grams of calcium glutarate is used and the reactants are heated for about 6 hours at about 10 atmospheres pressure.

The reaction product is esterified to the dimethyl etherester derivative by heating the acid in a reaction flask to about 100° to 110° C. Methanol is dropped in below the surface of the liquid. The methanol addition is continued until the distillate from the reaction is water-free. The reaction product is distilled using a spinning band column similar to that used in Example 1 and the dihydroresorcylpropionic acid is recovered by hydrolysis of the ester followed by crystallization as in Example 1.

Example 3

Example 1 is repeated except that 1.25 grams of potassium glutarate is used and the reactants heated for about six hours at a pressure of about 300 millimeters. The reaction product is distilled as in Example 1 to obtain the lactone of dihydroresorcylpropionic acid which in turn is hydrolyzed in 12 N hydrochloric acid to obtain delta-ketoazelaic acid directly.

Example 4

Example 1 is repeated except that no catalyst is used and the reaction is carried out at a temperature of 275° C. at one atmosphere of pressure. The rate of formation of acid components is from 2 to 4% per hour. After 10 hours of heating, the reaction mixture is distilled and hydrolyzed as in Example 1 to form the crystalline dihydroresorcylpropionic acid product.

The invention claimed is:
1. The process consisting essentially of heating glutaric anhydride at a temperature between 150° C. and 300° C. for a time sufficient to produce dihydroresorcylpropionic acid and delta-ketoazelaic acid.
2. The process set forth in claim 1 wherein said temperature is within the range from 200° C. to 250° C.
3. The process as set forth in claim 1 carried out with a catalyst selected from the group consisting of alkali metal glutarates, alkali metal hydroxides, alkaline earth glutarates and alkaline earth hydroxides.
4. The process as set forth in claim 1 carried out at a pressure from 10 millimeters to 10 atmospheres.

No references cited.